(12) United States Patent
Kan et al.

(10) Patent No.: US 11,625,803 B2
(45) Date of Patent: Apr. 11, 2023

(54) HIGH LAND TOURISM SAFETY RISK WARNING METHOD BASED ON REINFORCEMENT LEARNING

(71) Applicant: Chengdu University of Technology, Chengdu (CN)

(72) Inventors: Aike Kan, Chengdu (CN); Rui Luo, Chengdu (CN); Xiao Yang, Chengdu (CN); Yebin Wang, Chengdu (CN); Liang Chen, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 17/835,284

(22) Filed: Jun. 8, 2022

(65) Prior Publication Data

US 2023/0072985 A1 Mar. 9, 2023

(30) Foreign Application Priority Data

Aug. 11, 2021 (CN) .......................... 202110916234.0

(51) Int. Cl.
| | | |
|---|---|---|
| *G06Q 10/10* | (2012.01) | |
| *G06Q 40/08* | (2012.01) | |
| *G06Q 10/06* | (2012.01) | |
| *G06Q 30/02* | (2012.01) | |
| *G06Q 30/06* | (2012.01) | |
| *G06Q 50/26* | (2012.01) | |
| *G06N 3/08* | (2023.01) | |
| *G06F 17/18* | (2006.01) | |
| *G06Q 50/14* | (2012.01) | |

(52) U.S. Cl.
CPC .......... *G06Q 50/265* (2013.01); *G06F 17/18* (2013.01); *G06N 3/08* (2013.01); *G06Q 50/14* (2013.01)

(58) Field of Classification Search
CPC ...... G06Q 50/265; G06Q 50/14; G06F 17/18; G06N 3/08
USPC .......................................... 705/1.1–912, 325
See application file for complete search history.

(56) References Cited

U.S. PATENT DOCUMENTS

| | | | |
|---|---|---|---|
| 11,056,242 B1 * | 7/2021 | Jain ........................ | G16H 10/60 |
| 11,080,602 B1 * | 8/2021 | Oroojlooyjadid ..... | G06N 3/0454 |
| 2019/0258953 A1 * | 8/2019 | Lang .................... | G06N 3/0454 |
| 2019/0279081 A1 | 9/2019 | Pham et al. | |

(Continued)

FOREIGN PATENT DOCUMENTS

| | | |
|---|---|---|
| CN | 105761006 A | 7/2016 |
| CN | 107680376 A | 2/2018 |

(Continued)

*Primary Examiner* — Jonathan P Ouellette

(57) ABSTRACT

The invention relates to the field of tourism risk prediction, and particularly to a high land tourism safety risk warning method based on reinforcement learning, comprising: step S1, storing a tourism data set in a historical time period of a tourist site in a database, and based on the database, initializing a tourism risk warning indication function Q and a risk target function T; step S2, based on a tourism risk assessment factor sequence and combined with the selected tourism data set in the historical time period, training the tourism risk warning indication function Q and the risk target function T; and step 3, combined with an input time parameter and the trained tourism risk warning indication function Q, obtaining a warning action under the time parameter, and obtaining a risk assessment rank of the tourist site.

5 Claims, 2 Drawing Sheets

(56) References Cited

U.S. PATENT DOCUMENTS

| | | |
|---|---|---|
| 2020/0065665 A1 | 2/2020 | Nageshrao et al. |
| 2021/0171025 A1 | 6/2021 | Ishikawa et al. |
| 2022/0036199 A1* | 2/2022 | Prasanna .............. G06N 3/0472 |

FOREIGN PATENT DOCUMENTS

| CN | 108537691 A | 9/2018 |
|---|---|---|
| CN | 110472764 A | 11/2019 |
| CN | 111814050 A | 10/2020 |
| CN | 111897730 A | 11/2020 |
| CN | 111999765 A | 11/2020 |

* cited by examiner

HIGH LAND TOURISM SAFETY RISK WARNING METHOD BASED ON REINFORCEMENT LEARNING

CROSS REFERENCE TO RELATED APPLICATIONS

This application claims foreign priority of Chinese Patent Application No. 202110916234.0, filed on Aug. 11, 2021 in the China National Intellectual Property Administration, the disclosures of all of which are hereby incorporated by reference.

TECHNICAL FIELD

The present invention relates to the field of tourism risk prediction technologies, and particularly to a high land tourism safety risk warning method based on reinforcement learning.

BACKGROUND

Some large-scale high land tourist sites are popular resorts for tourists and extreme sports enthusiasts due to diverse landscapes, complex landforms, changeable climate and unfrequented places, and it is not accurate enough to rely solely on weather forecast. However, due to a threat of sudden high altitude sickness and effects of other complex and accidental changes in environment, it is a common occurrence that a patient suffering from hypertension and heart disease encounters a sudden situation or even sudden death, and it is even worse that a tourist in distress gets lost and is missing in the high land. Limited by a technical level, it is extremely difficult for a management department of the high land tourist site to search and rescue person in distress at present, with a high cost and a low success rate.

In an aspect of tourism safety warning method, it is necessary to put forward a method capable of predicting a possibility of occurrence of a safety risk as much as possible before occurrence of a tourism safety accident and transmitting a warning signal. Meanwhile, this method can adjust a risk assessment result based on the dynamic development of a dangerous situation, and provide a categorized and ranked warning prompt.

Through the comprehensive assessment of the prior art, the present application concludes that environmental factors to be considered for tourism safety comprise: (1) natural factors, comprising temperature, wind strength and earthquake, rainstorm, landslide, collapse, debris flow, torrential flood, and avalanche; (2) social factors, comprising sudden military control, epidemic and other sudden public health events (such as the spread of COVID-19 epidemic in areas of medium and high risk ranks); (3) state and individual behavior of tourist, comprising age, health condition and accident (such as injury and sudden illness) of a tourist; and (4) tourism safety management factors, comprising a bearing number of tourists in a tourist site, medical facilities, communication and an emergency response capability. All the above factors may be converted into discrete or continuous variables through certain quantitative indicators as environmental states in a reinforcement learning model. Some environmental states are discrete values, such as a rank of the COVID-19 epidemic in an area where the tourist site is located; and some environmental states are also represented by continuous values, such as a temperature and an amount of precipitation on the day.

Generally, the reinforcement learning model is that an Agent (intelligent agent) chooses an action to be used in the environment, and the environment is changed in state after receiving the action. Meanwhile, a reinforcement signal (reward or punishment) is generated and fed back to the Agent, and the Agent chooses a next action based on the reinforcement signal and the current state of the environment. The principle of choosing is to increase a probability of positive reinforcement (reward). The action of choosing not only affects an immediate reinforcement value, but also affects a state of the environment at the next time and a final reinforcement value.

Based on the above consideration, difficulties to be solved in the prior art comprise but are not limited to: (1) a way to effectively determine a reward function and a time discount factor, which is namely a way to quantify a possible loss caused by a disaster and a loss caused by a wrong decision; and (2) description of the environment, which means that a model is needed to describe a state transition probability matrix of the environment, especially a change of the environment state after the Agent makes a decision.

SUMMARY

The present invention aims to overcome the defects in the prior art, and provides a high land tourism safety risk warning method based on reinforcement learning, a combined method of actual data (such as actual loss of life and property) and expert scoring (quantization by disaster rank) is used in the present invention, different tourist sites have different state transition probabilities, and the present invention proposes that a certain amount of data is needed to drive a model.

The object of the present invention is achieved by the following technical solutions: a high land tourism safety risk warning method based on reinforcement learning comprises the following steps of:

step S1: storing a tourism data set in a historical time period of a tourist site in a database, and based on the database, initializing a tourism risk warning indication function Q and a risk target function T, wherein the tourism risk warning indication function Q and the risk target function T are calculated by a reinforcement learning algorithm;

step S2: based on a tourism risk assessment factor sequence and combined with the selected tourism data set in the historical time period, training the tourism risk warning indication function Q and the risk target function T; and step S3: combined with the input time parameter and the trained tourism risk warning indication function Q, obtaining a warning action under the time parameter, and based on the warning action, obtaining a risk assessment rank of the tourist site.

Preferably, in step S2, the method of training the tourism risk warning indication function Q and the risk target function T comprises the following steps of:

step S21: based on a ratio factor m, choosing a warning value a', using the warning value chosen at a moment t as an input, wherein the tourism risk warning indication function Q generates a first warning value at a first probability and generates a second warning value at a second probability based on historical data in the database, and when the first probability/the second probability is equal to m, executing step S22;

step S22: choosing the moment t from the historical time period, storing the warning value obtained by calculating the tourism risk warning indication function Q as the historical data, and executing step S23;

step S23: training multiple warning values at consecutive moments, wherein $S_t$ is a tourism risk assessment factor at the moment t, and $S_{t+1}$ is a tourism risk assessment factor at a moment t+1, and cropping a section of consecutive tourism warning assessment factors and substituting the same into the target function, wherein a starting moment of the consecutive moments is $t_0$, the target function y is obtained by choosing warning values at n moments and calculating a reward collection at the consecutive moments, and formulas for training are as follows:

$$y = \sum_{t=t_0}^{n} r_t = \sum_{t=t_0}^{n} \lambda \max_{a'} T(S_{t+1}, a'_t)$$

$$r_t = \lambda \max_{a'} T(S_{t+1}, a'_t)$$

$$a'_t = Q(S_t) = w_2 \cdot Sig(w_1 \cdot S_t + b_1) + b_2$$

$$T(S_{t+1}, a'_t) = w_2 \cdot Sig(V_1 \cdot S_{t+1} + V_2 \cdot a'_t + c_1) + c_2$$

$$Sig(x) = \frac{1}{1 + e^{-x}}$$

wherein $a'_t$ is the warning value at the moment t, $r_t$ is a reward value at the moment t, when the multiple warning values are input, multiple risk target functions T are obtained, a $$y = \sum_{t=t_0}^{n} r_t = \sum_{t=t_0}^{n} \lambda \max_{a'} T(S_{t+1}, a'_t)$$

$$r_t = \lambda \max_{a'} T(S_{t+1}, a'_t)$$

$$a'_t = Q(S_t) = w_2 \bullet Sig(w_1 \bullet S_t + b_1) + b_2$$

$$T(S_{t+1}, a'_t) = w_2 \bullet Sig(V_1 \bullet S_{t+1} + V_2 \bullet a'_t + c_1) + c_2$$

$$Sig(x) = \frac{1}{1 + e^{-x}}$$

function returns the maximum risk target function value T from the a multiple risk target functions T, $\lambda$ is a time discount factor, $w_1$, $w_2$, $b_1$, $b_2$, $V_1$, $V_2$, $c_1$ and $c_2$ are all free parameters and obtained by a gradient descent method, the warning value $a'_t$ at the moment t is calculated through the tourism risk warning indication function Q, and the risk target function T is used to optimize the tourism risk warning indication function Q through the database; and step S24: judging whether all the tourism risk assessment factor sequences are completely trained, if the sequences are completely trained, executing step S3; otherwise, executing step S21.

Preferably, in step S21, the ratio factor m is greater than 1.

Preferably, in step S23, by inputting a future moment x1, a tourism risk assessment factor $S_{x1}$ at a moment closest to the future moment x1 is chosen from the tourism risk assessment factor sequence arranged by time, and then a predicted warning value is obtained through the trained tourism risk warning indication function Q.

Preferably, in step S3, based on the predicted warning value, a corresponding warning action is matched, and the warning action comprises emergency resource transferring and temporary tourist site closing.

Preferably, the database comprises a natural factor data set of tourist site, an individual data set of tourist, a tourism safety management data set and a social factor data set.

In another aspect, a computer readable storage medium is provided, wherein the computer readable storage medium stores one or more computer programs, and the one or more computer programs, when executed by one or more processors, realize the high land tourism safety risk warning method based on reinforcement learning above.

In another aspect, a high land tourism safety risk prediction device based on reinforcement learning comprises one or more processors; and a computer readable storage medium, wherein the computer readable storage medium stores one or more computer programs; and the one or more computer programs, when executed by one or more processors, realize the high land tourism safety risk warning method based on reinforcement learning above.

In another aspect, a high land tourism safety risk warning system based on reinforcement learning comprises a collecting end, a processing end and a displaying end, wherein the collecting end is used for collecting historical data of a natural environment of a tourist site, social factor data, tourism safety management data and individual data of a tourist;

the processing end comprises a console;

the displaying end is used for displaying a tourism risk assessment rank of the tourist site; and the console stores one or more computer programs, and the one or more computer programs, when executed by one or more processors, realize the high land tourism safety risk warning method based on reinforcement learning above.

In another aspect, a use of the high land tourism safety risk warning method based on reinforcement learning above in safe-protection planning of the tourist site is provided.

The present invention has the beneficial effects as follows.

1. A machine learning model is used to assess the tourism risk factors, which avoids a wrong tourism risk warning action caused by misjudgment made by people, and may better process a possible sustained delay during tourism risk prediction.

2. A variety of different tourism risks are integrated, the model itself can intelligently judge a relationship between a risk importance and a risk to obtain a rule, and a key point of the present invention lies in adding an assessment and warning mechanism of an epidemic risk factor and a high land tourist site tourism safety risk factor which affect high land tourism.

3. A possibility of occurrence of a safety risk is predicted and a warning signal is transmitted, a risk assessment result can be adjusted based on dynamic development of a dangerous situation, and a categorized and ranked warning prompt is provided.

DETAILED DESCRIPTION

The technical solutions of the present invention are further described in detail hereinafter with reference to the drawings, but the scope of protection of the present invention is not limited to the following descriptions.

Embodiment 1

The embodiment comprises data collection and processing, and a risk assessment and warning assessment method based on a calculation result.

A data collection system comprises a weather and natural environment disaster data system, a human flow density and related crowd health monitoring system, a tourist site bearing pressure assessment system, an infectious disease risk ranking system, a traffic pressure and traffic risk system, and a social accident factor system.

The weather and natural environment disaster data system comprises a temperature and a temperature difference between day and night, a wind strength, a solar radiation intensity, an atmospheric oxygen content and earthquake, rainstorm and hail, landslide, debris flow, torrential flood, rolling stones, dangerous rock body collapse, and avalanche.

The human flow density and related crowd health monitoring system comprises a population density in a tourist site in an epidemic situation, a place of residence of a tourist, a risk rank of COVID-19 in a passing-by place, an individual health code rank of COVID-19, a number of individual vaccination times of COVID-19 vaccine, and an individual physical condition of a tourist whose tourist destination is in a high, cold and anoxic area over 3,000 meters.

The tourist site bearing pressure assessment system comprises a bearing capacity of a high-altitude plank road, a ropeway or a hiking trail, a fire safety, a medical and health condition and a rescue capacity, a protection capacity, a passenger flow bearing capacity, and a tourism device bearing capacity.

The infectious disease risk ranking system is mainly used for ranking a COVID-19 risk area of the tourist site.

The traffic pressure and traffic risk system comprises a demand of a traffic capacity inside the tourist site, a smoothness of a lifeline channel in the tourist site, construction of traffic infrastructure, and safety measures and sign arrangements in a road section and a sightseeing road section of a mountainous tourist site.

Figure 1:
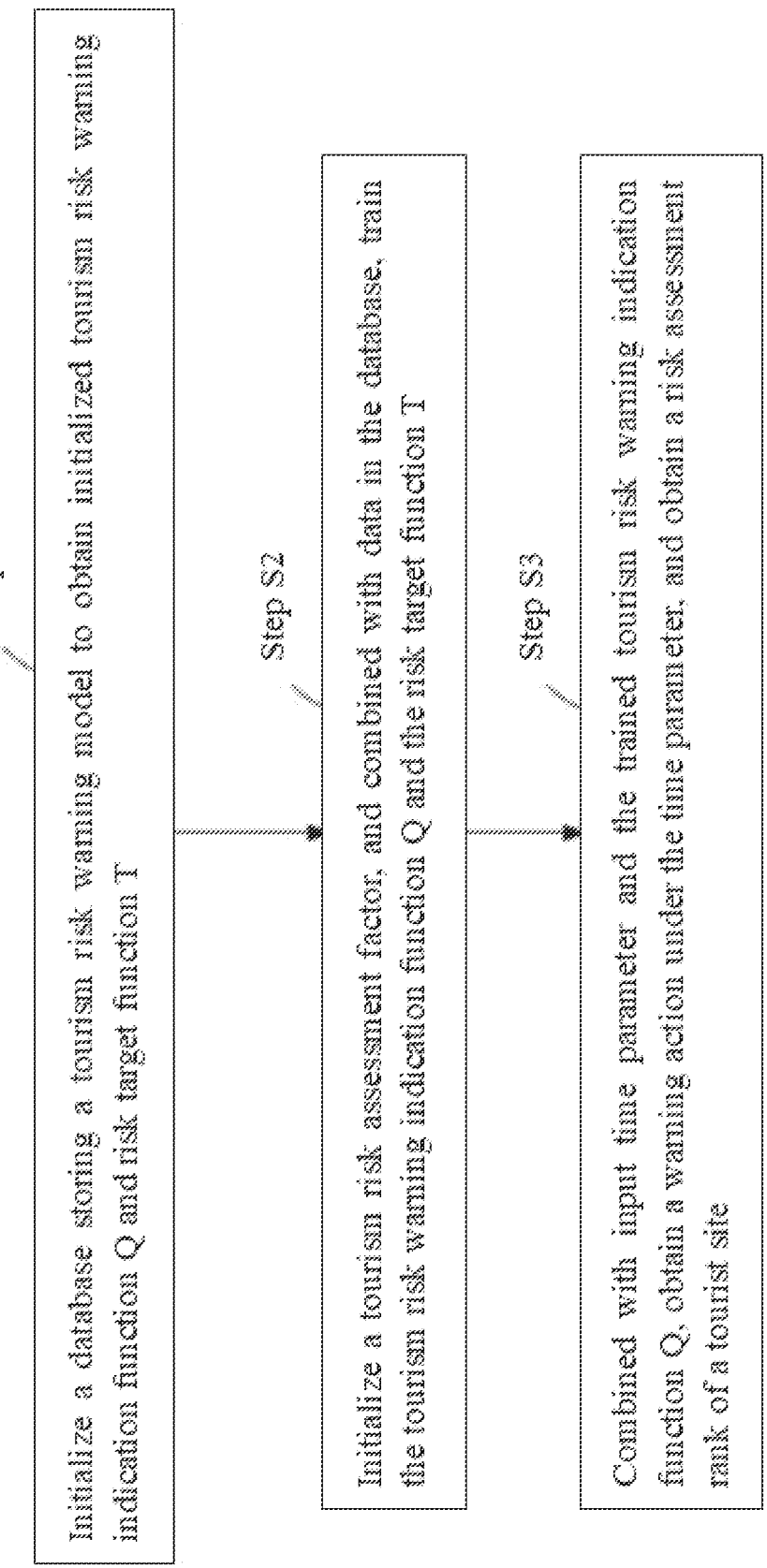
FIG. 1 is a working principle diagram of the present invention.

The social accident factor system comprises sudden military control, border access control, port closure, and shutdown of major traffic line and hub. With reference to FIG. 1, the description is made herein with reference to specific embodiments.

In S1, a database is initialized, and a warning model combining a tourism risk warning indication function Q and a risk target function T is established.

In S2, the tourism risk warning indication function Q and the risk target function T are initialized. The functions Q and T are both a neural network model. For example, one implementation is a neural network model of a multi-layer perceptron. A weight is initialized in a random method, and the function Q is optimized by taking the weight as an intermediate value variable.

In S3, a tourism risk assessment factor sequence is initialized, and quantified by specific tourism risk assessment warning and the weight.

Figure 2:
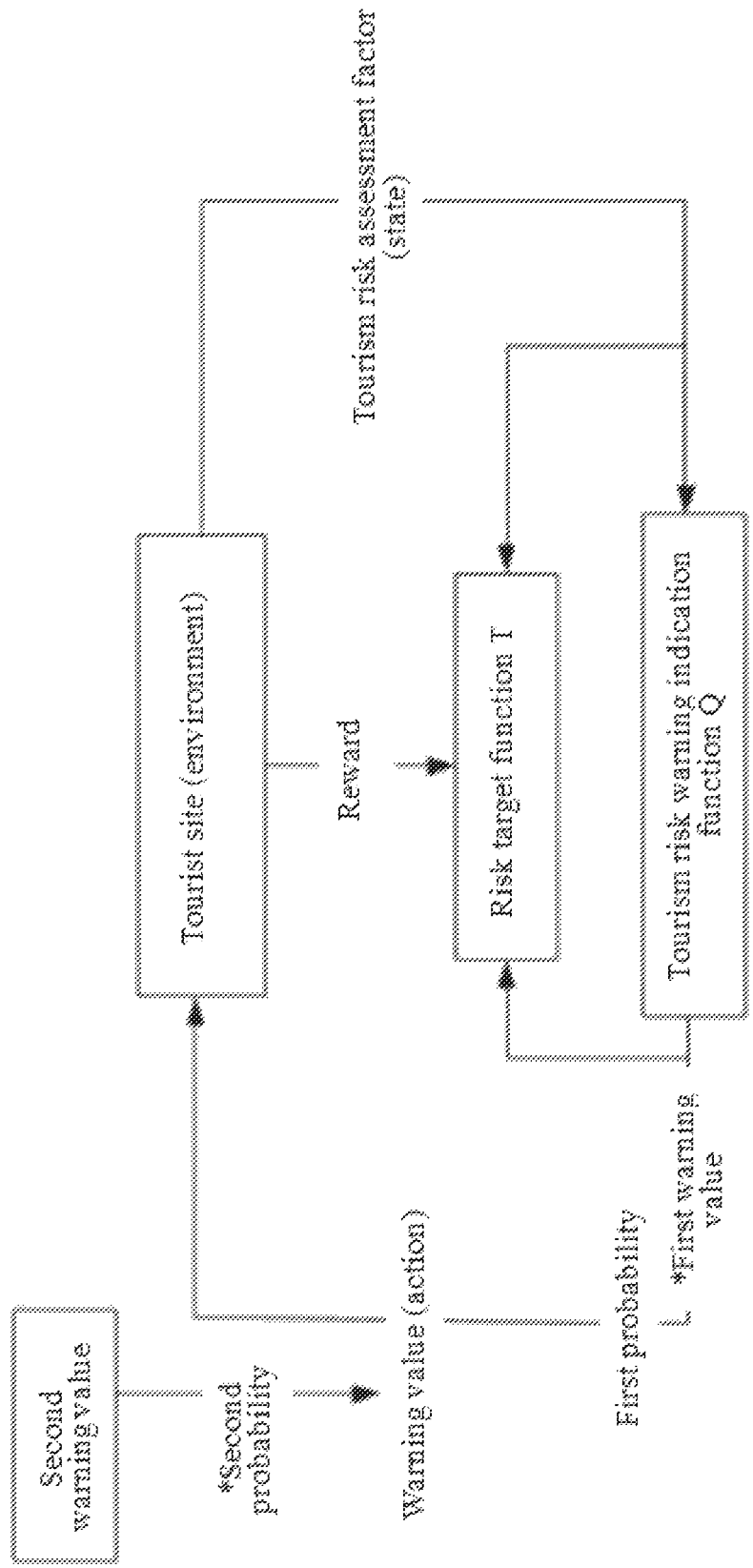
FIG. 2 is a diagram of establishment steps of a tourist site risk assessment and warning method of the present invention.

In S4, the model is trained. With reference to FIG. 2, in the embodiment, a predetermined warning action is provided based on the tourism risk warning indication function Q at a probability of 80% first. One tourism risk warning action is randomly generated at a probability of 20%, and a ratio factor m is equal to 4, with objects that the warning action generated at the first probability ensures a convergence and a stability of model training in data, and the warning action randomly generated at the second probability enables the trained function to explore a new tourism risk warning strategy in data.

In S5, with reference to a deep learning model, a current reward r is calculated through a current action a, wherein the a is equal to $a'_t$, and a current time risk factor, and a next time risk factor is calculated. In this step, the calculated risk factors are stored and substituted in calculation of the reward r of the current action in the next step. In this step, the risk factors are constantly updated during parameter iteration of action and background of the tourism risk factors.

In S6, the current action a, the reward r and the tourism risk assessment factors are stored.

In S7, a consecutive section is cropped from all the current action a, the reward r and the tourism risk assessment factor sequence stored for training.

In S8, a target function in training is set as $$y = \sum_{t=t_0}^{n} r_t = \sum_{t=t_0}^{n} \lambda \max_{a'} T(S_{t+1}, a'_t)$$

, wherein $a'_t$ is a warning value at a moment t.

In S9, the trained target function is in a form of mean error sum of squares. A gradient descent algorithm is used as a training method to update the weights (free parameters) of the neural network functions Q and T.

In S10, whether the risk sequence is finished is judged, and if the risk sequence is not finished, it goes back to S4 to perform operations of S4 to S9.

In a deep learning algorithm, with reference to FIG. 2, a current reward is calculated through the current warning action and the current tourism risk assessment factor s, and the next tourism risk assessment factor s is calculated. The calculated tourism risk assessment factor s is stored and substituted in calculation of the reward r of the current action in the next step, and then the tourism risk assessment factor s is continuously updated combined with iteration of the warning action and the data in the database.

The trained neural network models Q and T can perform effective tourism risk assessment and warning action based on each warning value, and actions (decisions) made on the environment may comprise issuing a risk warning (tourism generally has three risk warning ranks: third rank, yellow warning; second rank, orange warning; and first rank, red warning), mobilizing emergency resources (medical resources, vehicles, and communication), and temporarily closing the tourist site and evacuating tourists. With reference to Table 1, Table 1 illustrates related factors of the risk assessment factors, and Table 1 only lists four factors, which are not exhaustive herein.

TABLE 1

Specific risk degree in database

| Risk category | Partial data of database | Risk degree threshold of data set part |
|---|---|---|
| Natural factors | Due to particularities of a geological structure, a geomorphological condition and a climatic characteristic of the high land tourist site, the generated natural risk factors comprise: a low temperature, a large temperature difference between day and night, strong solar radiation, a low oxygen content, strong wind, and natural disasters, such as earthquake, rainstorm, landslide, collapse, debris flow, torrential flood and avalanche. | $S_1$ |
| Social factors | Due to effects of environmental pressures of a surrounding area and a neighboring country, a sudden geopolitical conflict, a public health incident and other social accidents, the social factors comprise: sudden military control, border access control, port closure, suspension of major traffic route and hub, and a risk management pressure caused by COVID-19 or a potential threat of epidemic and endemic disease. | $S_{21}$ |
| Individual and behavior of tourist | People suffering from cold, cardiovascular and cerebrovascular diseases, and lung diseases enter a high land area, or people have past medical history and constitution unsuitable for high altitude activities, or people perform strenuous activities after entering a high land tourist site, resulting in excessive physical exertion or other diseases.<br>High altitude sicknesses of the tourist are caused by a high, cold and anoxic environment above 3000 meters, and due to lack of oxygen, the tourist may have various discomforts, such as headache, fatigue, nausea, vomiting, insomnia and other high altitude sicknesses. The tourist with severe high altitude sicknesses may suffer from high altitude pulmonary edema, high altitude cerebral edema, high altitude hypertension, high altitude heart disease and other acute high altitude diseases.<br>There are accidental injuries. There are bites of a poisonous insect and a poisonous snake; a car accident; and sprain, injury from falling, and fracture.<br>There is the lack of high land tourism safety risk awareness and experience. The tourist has weak safety awareness, and lacks an ability to perceive and predict a risk.<br>The tourist trespasses on an undeveloped tourist route, leading to personal injury, and has an uncivilized behavior. | $S_{31}$ |
| Tourism safety management | Safety signs and control measures of the tourist site are imperfect, or even partially missing. There are limited signal coverage, many communication blind zones, and the lack of positioning and navigation facilities, leading to a situation of getting lost and losing contact.<br>Transportation and other infrastructures are lagging, and a distance between a town and a village in the area is far; and due to an accident, a lifeline channel from the tourist site to a large and medium-sized city is blocked or interrupted.<br>Medical conditions are lagging, and there are the lack of an emergency rescue team and an emergency support capability, and the lack of efficient information coordination and a command system for an emergency response and a rescue command.<br>Reception facilities in the tourist site are insufficient, or a tourist flow in the tourist site exceeds a bearing capacity. Transportation capacity allocation inside the tourist site cannot meet a requirement of tourist flow transportation. | $S_{41}$ |

It is worth noting that partial data in the above database is highest risk data in a data set. For example, the natural factors also comprise $S_{1i}$, wherein i=1, 2, 3 . . . n, n is a positive integer, and a value of i varies according to a severity of a natural environment, a severity of $S_{11}$ is greater than that of $S_{12}$, and similarly, other data sets also comprise $S_{2i}$, $S_{3i}$ and $S_{4i}$. In the embodiment, only the above four data sets are listed for introduction, and a final calculation formula of the tourism risk assessment factor is:

$$s = \frac{S_{1i} + S_{2i} + S_{3i} + S_{4i}}{U}$$

wherein U is a number of risk thresholds in the data sets, and U is equal to 4 herein. In traditional risk assessment for warning, in order to obtain a more accurate tourist site risk, in an initial stage, the tourism risk assessment factor sequence is obtained through the above calculation. The above risk category refers to current Standard of Rating for Quality of Tourist Sites, and the database is obtained based on an actual situation of the tourist site in a historical time period. In the model, through a reinforcement learning algorithm, an obtained value is more accurate and has higher reference significance. Subjective judgment and categorization are often followed, such as subjectively considering earthquake, rainstorm and landslide as bad environments in an area, and determining headache, fatigue and nausea as symptoms of a tourist who is not recommended to travel. When multiple factors appear, a subjective error of a final determination result is too large to intuitively assess a risk rank of the area. For each area, the subjective assessment method cannot be fully applied, with a tedious judgment process.

It is worth noting that based on the risk warning model, after obtaining a historical tourism data set of the tourist site, a risk warning function is realized through the trained model. The following Table 2 only lists four tourist sites to show an application effect of this method.

TABLE 2

Warning values of tourist sites

| Time | Tourist site | Warning value | Warning action | Risk assessment rank |
|---|---|---|---|---|
| Mar. 4, 2019 | xx tourist site of Lhasa, Tibet | $A_{20190304}$ | Safety coefficient level 1 Convenience coefficient level 1 Sightseeing coefficient level 1 | Third rank, yellow warning |
| May 18, 2020 | xx tourist site of Xining, Qinghai | $A_{20200518}$ | Safety coefficient level 2 Convenience coefficient level 2 Sightseeing coefficient level 2 | First rank, red warning |
| Sep. 10, 2021 | xx tourist site of Aba, Sichuan | $A_{20210910}$ | Safety coefficient level 2 Convenience coefficient level 2 Sightseeing coefficient level 2 | First rank, red warning |
| Nov. 5, 2022 | xx tourist site of Shihezi, Xinjiang | $A_{20221105}$ | Safety coefficient level 2 Convenience coefficient level 1 Sightseeing coefficient level 1 | Second rank, orange warning |

It is worth noting that the method may be displayed in a form of Table 2 through popularization and application, comprising but being not limited to forms of APP and webpage, so as to provide a user with more accurate tourist site risk assessment. The above Table 2 may be displayed as some function in the webpage. In models corresponding to the above four tourist sites, the initialized warning actions and ranks are set as 2 types and 3 ranks, thus being listed together for comparison, wherein representations of the warning values $A_{20190304}$, $A_{20200518}$, $A_{20210910}$ and $A_{20221105}$ are not limited to the above forms, which are only used for distinction. It is only a preferred example in the embodiment that the warning action comprises the safety coefficient, the convenience coefficient and the sightseeing coefficient, which are collectively referred to as one warning action. In practical application, the warning action may be a more specific tourism adjustment measure (providing more detailed reference items). Each warning value corresponds to one warning action, and a first probability of the warning action comes from the warning actions stored in the historical data set; and in addition, a second probability of the warning action comes from the function Q. In addition, in practical application, if risk degrees of multiple tourist sites are expected to be compared, the comparison is made under a same model, and all historical data sets of the multiple tourist sites are input, so that obtained output results are more comparative. All electronic components and computer programs in the present application are conventional technologies, and corresponding program design is performed based on the method of the present application, which will not be repeated herein.

TABLE 3

Warning actions stored in database

| Warning action | Tourist reference category | Tourist site reference category |
|---|---|---|
| Safety coefficient level 1 | High recommendation index, long sightseeing period, excellent safety protection, excellent fire-fighting facilities, excellent temperature, and excellent geographical environment | Reception is prepared in a peak season of the tourist site, and a beautiful environment of the tourist site is kept |
| Convenience coefficient level 1 | Sufficient vehicles arriving at the tourist site, convenient transportation in the tourist site, convenient shopping, and abundant interpreters | Reception is prepared in a peak season of the tourist site, and a beautiful environment of the tourist site is kept |
| Sightseeing coefficient level 1 | Optimum visiting period of the tourist site, multiple projects, and high satisfaction | Reception is prepared in a peak season of the tourist site, and a beautiful environment of the tourist site is kept |
| Safety coefficient level 2 | Low recommendation index, short sightseeing period, good safety protection, good fire-fighting facilities, good temperature, and good geographical environment | Enhancement of safety deployment of the tourist site is concerned |
| Convenience coefficient level 2 | Less vehicles arriving at the tourist site, less transportation means in the tourist site, inconvenient shopping, and lack of interpreters | Traffic coordination is concerned, and commuting vehicles are increased. |
| Sightseeing coefficient level 2 | Adjustment period of the tourist site, less projects, and low satisfaction | Project renovation is arranged, and a competitiveness of the tourist site is enhanced. |

It is worth noting that only some tourist reference category and tourist site reference category are listed above. In practical application, various influence factors and labeled bytes in tourism may be counted and processed by a big data crawler technology to obtain more comprehensive tourist reference category and tourist site reference category. Table 1 to Table 3 are all explanations based on the embodiment, which do not represent data types only comprised in the present application. Relying on the high land tourism safety risk warning method in the present application, an objective risk assessment result of the tourist site can be achieved.

It is worth noting that, in the present application, the warning actions are mixed in information of big data by the reinforcement learning algorithm, wherein some warnings are suggestions made by human experience, and some warnings are suggestions generated randomly. The ratio factor is added into the reinforcement learning algorithm, and a clustering performance of data is enhanced by the function to obtain the function Q which is more accurate and can even be used to predict a future tourist site risk. Moreover, not only a previous risk early warning rule can be found, but also a new risk warning action and a subsequent effect thereof can be explored through the Q and T functions in the present invention.

However, a data integration method is used in the present invention, the natural factors, the individual data of tourist and the social factors are all categorized. Under assessment of a plurality of experts, different risk degrees are obtained, and each risk degree also comprises a specific division and a corresponding score, so as to obtain a final tourism risk assessment factor. In a big data system of the database, the trained tourism risk assessment factors are more accurate, which can effectively help people with different needs to assess a tourism risk degree of an area, and combined with continuously updated warning actions, different tourism risk assessment factors are generated.

It is worth noting that, with reference to FIG. 2, a new tourism risk warning indication function Q is introduced in the embodiment, and data used as a training model generated by this method is mixed data. The warning action generated at the first probability ensures a convergence and a stability of model training in data, and the warning action randomly generated at the second probability enables the trained model to explore a new tourism risk warning strategy in data, with a warding action update factor m. In order to update the stored warning actions for the generated warning model, so that the trained model can explore the new tourism risk warning strategy, by setting the ratio factor, wherein first probability/second probability=m, it is ensured that generation of the warning action at the second probability can optimize the warning action maximumly, which means that through the model, the updated warning strategy is better than the warning strategy calculated last time, and m is a secondary calculation function. In the embodiment, it is preferred that the first probability is greater than the second probability. Under intervention of the time parameter, an accurate risk prediction value is obtained, and a maximum value capable of being obtained through a large amount of data training can be obtained, which means that an optimum ratio of the first probability to the second probability can be obtained. Considering the diversity of tourist sites, a factor value with an excessive deviation may be eliminated from the database each time during model training, so that there is no detailed introduction of m herein. For example, through calculation and comparison of tourist site data in many countries and areas, it is found that an optimum m value of a tourist site which is often established for a long time and located in the city is larger than an optimum m value of a tourist site which is out in the wild and inaccessible to people. Whether the environment of the tourist site is changeable or not determines the optimum m value.

It is worth noting that the present application is based on the needs of the society, and more accurate data is obtained to assess the tourist site risk degree, which is of great significance for subsequent large-scale activity site selection, and individual and group tourism reference. In May, 2021, 171 people participated in the Fourth Yellow River Shilin Mountain Marathon 100-kilometer cross-country race in 2021 held in Jintai County, Baiyin City, Gansu Province, and in a high land stage with a highest altitude of 2,230 meters, the participants encountered extreme weather changes such as strong wind, precipitation and cooling, resulting in a major safety accident in which 21 people were killed and 8 people were injured. The after-the-fact investigation report shows that the organizer of the game did not take effective measures after receiving the special report of meteorological information and the blue warning of strong wind from the meteorological department before the game; failed to include wind-proof and warm-keeping equipment in the compulsory equipment list according to the requirements of high-altitude games; unreasonably set supply points and medical aid points in the 100-kilometer cross-country race track; taken no measure to strengthen and improve communication conditions; failed to formulate special emergency plans and security measures according to the prescribed standards; and provided insufficient early rescue after receiving the request for rescue due to the serious shortage of emergency rescue forces. Under actions of the above multiple and serial crisis factors, this sudden public safety incident was triggered. In addition, epidemiological histories of the participants were not strictly checked and strict measures to prevent and control COVID-19 were not taken in the game, and gathering of such a large number of people from different places might also lead to the accidental spread of the epidemic which was still under high-pressure prevention and control. It is not difficult to see that high land tourism accidents have occurred many times in recent years, and each accident may bring great loss of life and property. Therefore, advanced technology and method for high land tourism safety risk assessment and warning are urgent needs of governments at all levels, emergency management departments, tourism enterprises and tourists.

It is worth noting that the reinforcement learning is preferred among many neural network algorithms in the present application, because the reinforcement learning generates an agent interacting with an external environment, and the agent can remember a past experience and make a judgment and a decision on a current environment. A learning behavior of the agent in the reinforcement learning may be regarded as a Markov decision-making process. A common learning method is called a Q-learning method, which means that the agent needs to store a Q value of an action a under a condition of a state s, and the agent can make a corresponding action based on a maximum Q value under operation, so as to achieve an effect of making a correct decision in a complex environment. A process of determining the Q value lies in maximizing the reward accumulated for a certain period of time, which is called a return r. The return is calculated by multiplying a reward at each time point by a time discount factor and summing the products up, and the risk warning required by the present application can be obtained.

It is worth noting that difficulties to be solved by the present invention comprise: (1) a way to effectively determine the reward function and the time discount factor, which is namely a way to quantify a possible loss caused by a disaster and a loss caused by a wrong decision, wherein a combined method of actual data (such as actual loss of life and property) and expert scoring (quantization by disaster rank) is used in the present invention; and (2) description of the environment, which means that a model is needed to describe a state transition probability matrix of the environment, especially a change of the environment state after the Agent makes a decision, wherein different tourist sites have different state transition probabilities, and the present invention proposes that a certain amount of data is needed to drive a model. A time sequence difference method is a basic method in the reinforcement learning, and by using an iteration relation of a value function, a Bellman equation is listed to obtain an optimum strategy.

Based on environmental factors, the Agent performs tourism risk warning based on the above environment variable, and actions (decisions) made on the environment may comprise issuing a risk warning (tourism generally has three risk warning ranks: third rank, yellow warning; second rank, orange warning; and first rank, red warning), mobilizing emergency resources (medical resources, vehicles, and communication), and temporarily closing the tourist site and evacuating tourists.

In addition, some occasional specific situations in data processing also need to be processed specially, comprising partial data missing (such as weather or geological disaster data incapable of being obtained in a certain period of time), and the missing data needs to be assessed by the model. At the beginning of model design, all possible factors need to be considered, and if any factors that are not considered are added, the model needs to be readjusted. If the data missing occurs in a certain period of time, the missing data is assessed by a recurrent neural network or a LSTM (long-short term memory) model.

It is worth noting that the method comprises but is not limited to, being applied in an APP. Users only need to fill data of themselves, such as physical condition, travel period and travel appeal, based on needs of themselves, and a corresponding tourist site may be matched through the algorithm pre-stored in the APP. Combined with application of the implementation, a tourism risk degree of the tourist site and a recommended tourist site with a lower risk degree are obtained. The latest natural factors of tourist sites are regularly updated in the database to ensure that obtained risk rank assessment results are more accurate.

The above descriptions are only the preferred implementations of the present invention. It should be understood that the present invention is not limited to the forms disclosed herein, which should not be regarded as excluding other embodiments, but can be used in various other combinations, modifications and environments, and can be changed by the above teachings or the technology or knowledge in related fields within the scope of idea described herein. However, the modifications and changes made by those skilled in the art without departing from the spirit and scope of the present invention should fall within the scope of protection of the appended claims.

The invention claimed is:

1. A high land tourism safety risk warning method based on reinforcement learning, comprising the following steps of:

step S1: storing a tourism data set in a historical time period of a tourist site in a database, and based on the database, initializing a tourism risk warning indication function Q and a risk target function T, wherein the tourism risk warning indication function Q and the risk target function T are calculated by a reinforcement learning algorithm;

step S2: based on a tourism risk assessment factor sequence in the database and combined with the tourism data set in the historical time period, training the tourism risk warning indication function Q and the risk target function T, wherein the tourism risk assessment factor sequence is a sequence composed of natural factors in the database ranked by a risk level, and in step S2, the method of training the tourism risk warning indication function Q and the risk target function T comprises the following steps of:

step S21: based on a ratio factor m, choosing a warning value a', using the warning value chosen at a moment t as an input, wherein the tourism risk warning indication function Q generates a first warning value at a first probability and generates a second warning value at a second probability based on historical data in the database, and when the first probability/the second probability is equal to m, executing step S22;

step S22: choosing the moment t from the historical time period, storing the warning value obtained by calculating the tourism risk warning indication function Q as the historical data, and executing step S23;

step S23: training multiple warning values at consecutive moments, wherein $S_t$ is a tourism risk assessment factor at the moment t, and $S_{t+1}$ is a tourism risk assessment factor at a moment t+1, and cropping a section of consecutive tourism warning assessment factors and substituting the same into the target function, wherein a starting moment of the consecutive moments is $t_0$, the target function y is obtained by choosing warning values at n moments and calculating a reward collection at the consecutive moments, and formulas for training are as follows:

$$y = \sum_{t=t_0}^{n} r_t = \sum_{t=t_0}^{n} \lambda \max_{a'} T(S_{t-1}, a'_t)$$

$$r_t = \lambda \max_{a'} T(S_{t+1}, a'_t)$$

$$a'_t = Q(S_t) = w_2 \cdot Sig(w_1 \cdot S_t + b_1) + b_2$$

$$T(S_{t+1}, a'_t) = w_2 \cdot Sig(V_1 \cdot S_{t+1} + V_2 \cdot a'_t + c_1) + c_2$$

$$Sig(x) = \frac{1}{1 + e^{-x}}$$

$$y = \sum_{t=t_0}^{n} r_t = \sum_{t=t_0}^{n} \lambda \max T(S_{t-1}, a_t)$$

$$r_t = \lambda \max T(S_{t+1}, a_t)$$

$$a_t = Q(S_t) = w_2 \cdot Sig(w_1 \cdot S_t + b_1) + b_2$$

$$T(S_{t+1}, a_t) = w_2 \cdot Sig(V_1 \cdot S_{t+1} + V_2 \cdot a_t + c_1) + c_2$$

$$Sig(x) = \frac{1}{1 + e^{-x}}$$

wherein $a_t$ at is the warning value at the moment t, $r_t$ is a reward value at the moment t, when the multiple warning values are input, multiple risk target functions T are obtained, a max function returns the maximum risk target function value T from the multiple risk target functions T, $\lambda$ is a time discount factor, $w_1$, $w_2$, $b_1$, $b_2$, $V_1$, $V_2$, $c_1$ and $c_2$ are all free parameters and obtained by a gradient descent method, the warning value $a_t$ at the moment t is calculated through the tourism risk warning indication function Q, and the risk target function T is used to optimize the tourism risk warning indication function Q through the database;

step S24: judging whether all the tourism risk assessment factor sequences are completely trained, if the sequences are completely trained, executing step S3; otherwise, executing step S21; and step S3: combined with the input time parameter and the trained tourism risk warning indication function Q, obtaining a warning action under the time parameter, and based on the warning action, obtaining a risk assessment rank of the tourist site;

initiating the warning action, including emergency resource transferring and temporary tourist site closing, according to the risk assessment rank of the tourist site.

2. The high land tourism safety risk warning method based on reinforcement learning according to claim 1, wherein in step S21, the ratio factor m is greater than 1.

3. The high land tourism safety risk warning method based on reinforcement learning according to claim 2, wherein in step S23, by inputting a future moment x1, a tourism risk assessment factor $S_{x1}$ at a moment closest to the future moment x1 is chosen from the tourism risk assessment factor sequence arranged by time, and then a predicted warning value is obtained through the trained tourism risk warning indication function Q.

4. A non-transitory computer readable storage medium, wherein the computer readable storage medium stores one or more computer programs which when executed by one or more processors results in performance of steps comprising:

step S1: storing a tourism data set in a historical time period of a tourist site in a database, and based on the database, initializing a tourism risk warning indication function Q and a risk target function T, wherein the tourism risk warning indication function Q and the risk target function T are calculated by a reinforcement learning algorithm;

step S2: based on a tourism risk assessment factor sequence in the database and combined with the tourism data set in the historical time period, training the tourism risk warning indication function Q and the risk target function T, wherein the tourism risk assessment factor sequence is a sequence composed of natural factors in the database ranked by a risk level, and in step S2, the method of training the tourism risk warning indication function Q and the risk target function T comprises the following steps of:

step S21: based on a ratio factor m, choosing a warning value a, using the warning value chosen at a moment t as an input, wherein the tourism risk warning indication function generates a first warning value at a first probability and generates a second warning value at a second probability based on historical data in the database, and when the first probability/the second probability is equal to executing step S22;

step S22: choosing the moment t from the historical time period, storing the warning value obtained by calculating the tourism risk warning indication function Q as the historical data, and executing step S23;

step S23: training multiple warning values at consecutive moments, wherein St is a tourism risk assessment factor at the moment t, and $S_{t+1}$ is a tourism risk assessment factor at a moment t+1, and cropping a section of consecutive tourism warning assessment factors and substituting the same into the target function, wherein a starting moment of the consecutive moments is $t_0$, the target function y is obtained by choosing warning values at n moments and calculating a reward collection at the consecutive moments, and formulas for training are as follows:

$$y = \sum_{t=t_0}^{n} r_t = \sum_{t=t_0}^{n} \lambda \max T(S_{t-1}, a_t)$$

$$r_t = \lambda \max T(S_{t+1}, a_t)$$

$$a_t = Q(S_t) = w_2 \cdot Sig(w_1 \cdot S_t + b_1) + b_2$$

$$T(S_{t+1}, a_t) = w_2 \cdot Sig(V_1 \cdot S_{t+1} + V_2 \cdot a_t + c_1) + c_2$$

$$Sig(x) = \frac{1}{1 + e^{-x}}$$

wherein $a_t$ is the warning value at the moment t, $r_t$ is a reward value at the moment t, when the multiple warning values are input, multiple risk target functions T are obtained, a max function returns the maximum risk target function value T from the multiple risk target functions T, $\lambda$ is a time discount factor, $w_1$, $w_2$, $b_1$, $b_2$, $V_1$, $V_2$, $c_1$ and $c_2$ are all free parameters and obtained by a gradient descent method, the warning value at $a_t$ the moment t is calculated through the tourism risk warning indication function Q, and the risk target function T is used to optimize the tourism risk warning indication function Q through the database;

step S24: judging whether all the tourism risk assessment factor sequences are completely trained, if the sequences are completely trained, executing step S3; otherwise, executing step S21; and step S3: combined with the input time parameter and the trained tourism risk warning indication function Q, obtaining a warning action under the time parameter, and based on the warning action, obtaining a risk assessment rank of the tourist site;

initiating the warning action, including emergency resource transferring and temporary tourist site closing, according to the risk assessment rank of the tourist site.

5. A high land tourism safety risk prediction device based on reinforcement learning, comprising one or more processors; and a non-transitory computer readable storage medium, wherein the non-transitory computer readable storage medium stores one or more computer programs; and the one or more computer programs which when executed by one or more processors results in performance of steps comprising:

step S1: storing a tourism data set in a historical time period of a tourist site in a database, and based on the database, initializing a tourism risk warning indication function Q and a risk target function T, wherein the tourism risk warning indication function Q and the risk target function T are calculated by a reinforcement learning algorithm;

step S2: based on a tourism risk assessment factor sequence in the database and combined with the tourism data set in the historical time period, training the tourism risk warning indication function Q and the risk target function T, wherein the tourism risk assessment factor sequence is a sequence composed of natural factors in the database ranked by a risk level, and in step S2, the method of training the tourism risk warning indication function Q and the risk target function T comprises the following steps of:

step S21: based on a ratio factor m, choosing a warning value a, using the warning value chosen at a moment t as an input, wherein the tourism risk warning indication function Q generates a first warning value at a first probability and generates a second warning value at a second probability based on historical data in the database, and when the first probability/the second probability is equal to m, executing step S22;

step S22: choosing the moment t from the historical time period, storing the warning value obtained by calculating the tourism risk warning indication function as the historical data, and executing step S23;

step S23: training multiple warning values at consecutive moments, wherein $S_t$ is a tourism risk assessment factor at the moment t, and $S_{t+1}$ is a tourism risk assessment factor at a moment t+1, and cropping a section of consecutive tourism warning assessment factors and substituting the same into the target function, wherein a starting moment of the consecutive moments is $t_0$, the target function y is obtained by choosing warning values at n moments and calculating a reward collection at the consecutive moments, and formulas for training are as follows:

$$y = \sum_{t=t_0}^{n} r_t = \sum_{t=t_0}^{n} \lambda \max T(S_{t-1}, a_t)$$

-continued $$r_t = \lambda \max T(S_{t+1}, a_t)$$

$$a_t = Q(S_t) = w_2 \cdot Sig(w_1 \cdot S_t + b_1) + b_2$$

$$T(S_{t+1}, a_t) = w_2 \cdot Sig(V_1 \cdot S_{t+1} + V_2 \cdot a_t + c_1) + c_2$$

$$Sig(x) = \frac{1}{1 + e^{-x}}$$

wherein $a_t$ is the warning value at the moment t $r_t$ is a reward value at the moment t, when the multiple warning values are input, multiple risk target functions T are obtained, a max function returns the maximum risk target function value T from the multiple risk target functions T, $\lambda$ is a time discount factor, $w_1$, $w_2$, $b_1$, $b_2$, $V_1$, $V_2$, $c_1$ and $c_2$ are all free parameters and obtained by a gradient descent method, the warning value $a_t$ at the moment t is calculated through the tourism risk warning indication function Q, and the risk target function T is used to optimize the tourism risk warning indication function Q through the database;

step S24: judging whether all the tourism risk assessment factor sequences are completely trained, if the sequences are completely trained, executing step S3; otherwise, executing step S21; and step S3: combined with the input time parameter and the trained tourism risk warning indication function Q, obtaining a warning action under the time parameter, and based on the warning action, obtaining a risk assessment rank of the tourist site;

initiating the warning action, including emergency resource transferring and temporary tourist site closing, according to the risk assessment rank of the tourist site.

* * * * *